Sept. 23, 1969    L. A. SCHLABACH ET AL    3,469,169
INVERTER APPARATUS
Filed Nov. 29, 1967    3 Sheets-Sheet 1

WITNESSES:

INVENTORS
Leland A. Schlabach &
John Rosa.
BY
ATTORNEY

United States Patent Office 3,469,169
Patented Sept. 23, 1969

3,469,169
INVERTER APPARATUS
Leland A. Schlabach and John Rosa, Pittsburgh, Pa., assignors to Westinghouse Electric Corporation, Pittsburgh, Pa., a corporation of Pennsylvania
Filed Nov. 29, 1967, Ser. No. 686,442
Int. Cl. H02m 7/46
U.S. Cl. 321—5                                10 Claims

ABSTRACT OF THE DISCLOSURE

The present disclosure relates to inverter apparatus of the forced commutation type operative with a direct current source, which may have a relatively low output, for supplying alternating current to a load. The inverter includes a plurality of controlled switching devices, such as silicon controlled rectifiers, for controllably completing a circuit to the load. A commutating circuit is provided including commutating control switching devices and inductive and capacitive elements to commutate the plurality of controlled switching devices. The commutating inductive element is provided to reduce current flow in the commutating control switching devices by current transformer action, and, through voltage transformer action and the use of unilateral devices, such as diodes, the voltage levels of the capacitive elements are accurately controlled and the energy stored in the commutating circuit is recovered for high efficiency of operation.

BACKGROUND OF THE INVENTION

The present invention relates to inverter apparatus of the forced commutation type and, more particularly, to inverter apparatus operative at high efficiencies and at controlled voltage and current levels.

When controlled switching devices, such as silicon controlled rectifiers, are utilized in inverter circuitry, it is necessary that some means be provided in the inverter for commutating the switching devices at predetermined times. One technique for turning off selected of the controlled switching devices is called "forced commutation" and utilizes auxiliary commutation controlled rectifiers and inductive and capacitive elements. By turning on the auxiliary controlled rectifier at the desired time, a reverse bias is applied across the selected controlled switching devices via the inductive and capacitive elements of the commutation circuit to effect the turn-off of these selected devices. A forced commutation inverter system is shown in copending application Ser. No. 520,497, filed Jan. 19, 1966, by John Rosa and assigned to the same assignee as the present application, which requires only two commutation controlled rectifiers in a single or polyphase inverter system for turning off the respective controlled rectifiers of a single or polyphase silicon controlled rectifier (SCR) bridge circuit used therein.

In that the commutating circuit of a forced commutation inverter system includes inductors, energy is trapped in the circuit after the commutation interval at the end of each output half-cycle of operation, and, thus, it must either be recovered or dissipated before the next half-cycle of operation. The stored energy may be dissipated by providing a separate current path including resistive elements in the commutating circuit. However, this results in the loss of energy and lowering of the efficiency of the system which may be appreciable at higher frequencies and, even at 60 Hz. rates may present a large percentage of the total energy loss in the inverter system. It is highly advantageous if a commutation circuit can be provided which recovers the trapped energy rather than dissipating it.

When it is necessary to operate an inverter from a direct current source having a relatively low input voltage, it becomes highly desirable to increase the voltage level utilized for commutation purposes. The use of the higher commutating voltage permits use of correspondingly smaller commutating capacitors thereby reducing the weight and size of the inverter. Moreover, in many instances, it would be desirable to reduce the amount of current carried by the auxiliary commutating controlled rectifiers and thereby reduce the power dissipated in these devices. Moreover, the lower current permits the use of devices having lower current ratings.

SUMMARY OF THE INVENTION

It is therefore an object of the present invention to provide new and improved inverter apparatus including a commutation circuit providing trapped energy recovery for high efficiency of operation thereof and controlled commutation voltage and current levels.

Broadly, the present invention provides inverter apparatus operative from a direct current source and employing a plurality of controlled switching devices for selectively supplying alternating current to a load. A commutation circuit is provided for effecting the commutation of the controlled switching devices and includes a commutation controlled switching device and inductance means. By current transformer action the current through the commutation device is limited and through voltage transformer action, the voltage levels in the commutation circuit are controlled. Energy trapped in the commutation circuit is returned to the source whenever the desired voltage levels are obtained for high efficiency operation.

DESCRIPTION OF THE PREFERRED EMBODIMENTS

Figure 1:
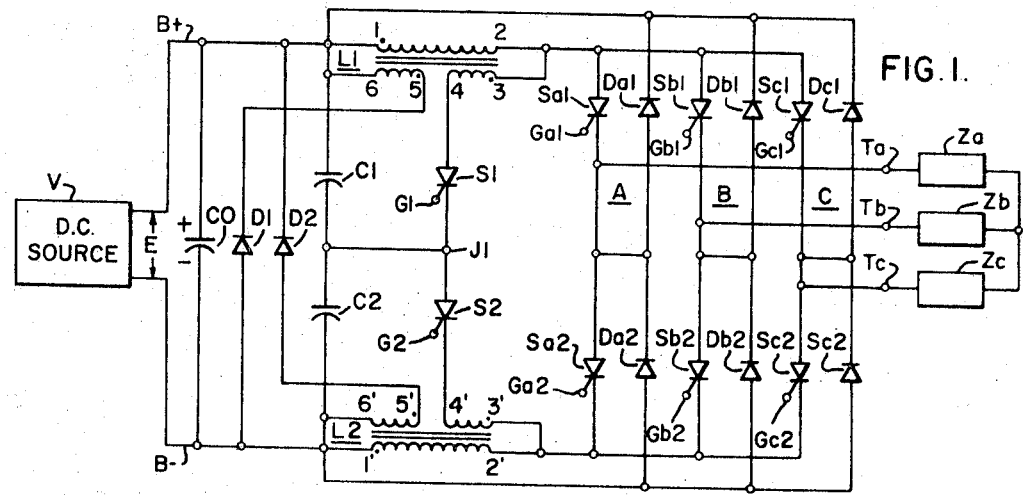
FIGURE 1 is a schematic-block diagram of one embodiment of the present invention.

Referring now to FIGURE 1, an inverter system is shown having a DC source V acting as the operating supply therefor. The output voltage of the DC source V is the voltage E which is provided between a B+ line and a B— line as shown. A storage capactor C0 is connected between the B+ and B— lines. The inverter as shown in FIG. 1 is designed to supply a three-phase load, including the impedances $Za$, $Zb$ and $Zc$, with an alternating current waveform. To supply the bidirectional conducting path through the load impedances $Za$, $Zb$ and $Zc$, a bridge network including legs A, B and C is provided. A pair of controlled switching devices is provided in each of the legs A, B and C and may comprise silicon controlled rectifiers. Thus the leg A includes controlled rectifiers $Sa1$ and $Sa2$; leg B includes controlled rectifiers $Sb1$ and $Sb2$ and leg C includes controlled rectifiers $Sc1$ and $Sc2$. The junction point in the leg A between the controlled rectifiers $Sa1$ and $Sa2$ is connected to a terminal $Ta$ at one end of the load impedance $Za$; the junction point in the leg B between the controlled rectifiers $Sb1$ and $Sb2$ is connected to a terminal $Tb$ at one end of the load impedance $Zb$; and the junction point in the leg C between the controlled rectifiers $Sc1$ and $Sc2$ is connected to a terminal $Tc$ at one end of the impedance $Zc$. The other end of the impedances $Za$, $Zb$ and $Zc$ are commonly connected. The controlled rectifiers S$a$1, S$a$2, S$b$1, S$b$2, S$c$1 and S$c$2 are, respectively, provided with gate terminals G$a$1, G$a$2, G$b$1, G$b$2, G$c$1, G$c$2, with the controlled rectifiers being turned on in response to gating signals applied to the respective gate terminals. Diodes D$a$1, D$b$1 and D$c$1 are respectively connected between the junction point in each of the legs A, B and C to the B+ line with the cathodes thereof at the B+ line. Diodes D$a$2, D$b$2 and D$c$2 are connected between the junction point in each of the legs A, B and C and the B— line, with the anode of the diodes toward the B— line.

The inverter apparatus of FIGURE 1 is provided with a commutating circuit which includes a commutating inductor L1 including a winding 1-2, a winding 3-4 and a winding 5-6. The windings being poled according to the dot convention as indicated on the figure. A commutation inductor L2 is provided including windings 1'-2', 3'-4' and 5'-6' having a dot convention as indicated. The winding 1-2 of the inductor L1 is connected between the B+ line and the anode electrodes of the controlled rectifier S$a$1, S$b$1 and S$c$1. The winding 1'-2' of the inductor L2 is connected between the B— line and the cathode electrodes of the controlled rectifiers S$a$2, S$b$2 and S$c$2. The winding 3-4 is connected in current transformer relationship with the winding 1-2 with the 3 end connected to the 2 end and the 4 end connected to the anode of an auxiliary switching device S1, which may comprise a silicon controlled rectifier. The cathode of the commutation controlled rectifier S1 is connected to a junction J1, with a commutation capacitor C1 connected between the junction J1 and the B+ line. The winding 3'-4' of the transformer L2 is connected analogously to winding 3-4 of transformer L1. The 3' end is connected to the cathode of the controlled rectifiers S$a$2, S$b$2 and S$c$2. The 4' end is connected to the cathode of a commutation controlled rectifier device S2, with the anode thereof connected to the junction J1. A commutation capacitor C2 is connected between the junction J1 and the B— line. The winding 5-6 of the transformer L1 is connected in series with a diode D1 with the cathode of the diodes 1 connected to the 6 end and the anode thereof connected to the B— line. The 6 end of the winding 5-6 is connected to the B+ line. The winding 5'-6' is connected in series with a diode D2, with the cathode of the diode D2 connected to the B+ line, and the 6' end of the winding 5'-6' is connected to the B— line.

Figure 2:
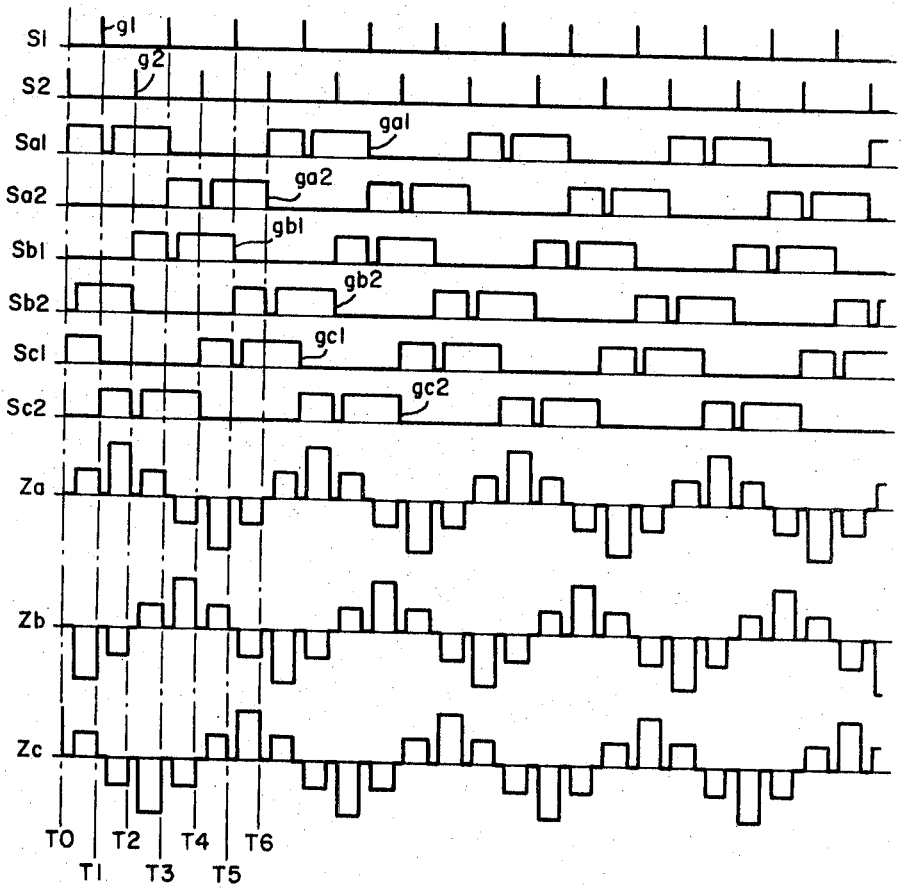
FIG. 2 shows a plurality of waveforms utilized in explaining the operation of FIGURE 1.

Referring now to FIGURE 2, the pulse waveforms as applied to the gate electrodes of the various controlled rectifiers are indicated in the curves designated similarly S1, S2, S$a$1, S$a$2, S$b$1, S$b$2, S$c$1 and S$c$2. The commutation of the top row of controlled devices S$a$1, S$b$1, S$c$1, is instigated by the turning on of the controlled rectifier S1, and the turning off of the bottom row of the controlled rectifiers S$a$2, S$b$2, S$c$2 is effected by the turning on of the commutation controlled rectifier S2, as will be explained below.

The pulse waveforms S$a$1 through S$c$2 are supplied to the gate electrodes of the bridge controlled rectifiers so as to provide conductive paths therethrough to the load impedances Z$a$, Z$b$ and Z$c$. The load impedances Z$a$, Z$b$ and Z$c$ are respectively provided with voltage waveforms as shown in curves similarly designated Z$a$, Z$b$ and Z$c$ in FIGURE 2. The above cited copending application described suitable circuitry for supplying the gating pulses as indicated in FIGURE 2 hereof.

During the time interval T0 to T1, as shown in FIG. 2, controlled rectifiers S$a$1, S$c$1 and S$b$2 are gated on. A circuit path is provided from the B+ line, through the winding 1-2 of the inductor L1, controlled rectifiers S$a$1 and S$c$1, to the load impedances Z$a$ and Z$c$, respectively, to provide a positive unit of voltage thereto as shown in the curves Z$a$ and Z$c$ of FIG. 2, respectively. The return current path is provided through the load impedance Z$b$ in the negative direction to provide two negative units of voltage thereto, see curve E$z$$b$, and through the controlled rectifier S$b$2, the winding 1'-2' of inductor L2 to the B— line. At the time T1, a gating pulse $g$1 is applied to the commutating controlled rectifier S1 turning it on. At the time T1 the controlled rectifier S2 is in its off state.

Figure 3:
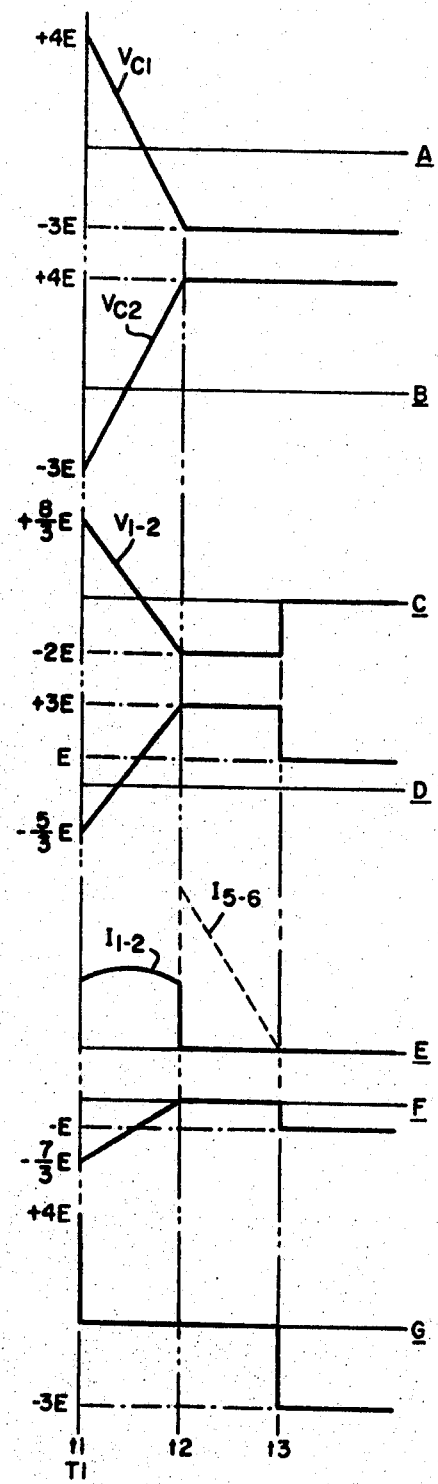
FIG. 3 shows a plurality of waveforms utilized in explaining the operation of FIGURE 1.

Referring now to FIG. 3, the commutation operation of circuitry of FIG. 1 will be explained. Assume at a time prior to the same T1 ($t$1 in FIG. 3) that the commutating capacitor C1 is charged to positive voltage level 4E, that is, four times the magnitude of the input voltage E of the DC source V. Also assume that the commutating capacitor C2 is charged to a negative voltage level —3E as indicated in curve B of FIG. 3. The numbers utilized in explaining the operation of FIG. 1 are only used by way of example. Other voltage levels could, of course, be provided by the selection of the turns ratio of the inductors L1, L2 to be different than as described herein. For the purposes of explanation consider that the windings 1-2 have 2 N turns and that the winding 3-4 and 5-6 each have 1 N turn. Also assume that the transformer L2 has similar turns ratio with the ratio of L1'–2' to 3'–4' or 5'–6' being 2:1.

At the time $t$1, T1, when the commutation device S1 is turned on the capacitor C1 voltage 4E is thus placed across the windings 1-2 and 3-4 in series therewith. Due to the 2:1 turns ratio between the windings 1-2 and the winding 3-4, $$+\frac{8}{3}E$$

(with the dot positive) will appear across the winding 1-2 and $$\frac{4}{3}E$$

will appear across the winding 3-4. The voltage across the winding 1-2 is shown in curve C of FIG. 3. The voltage across the top row of controlled rectifier S1, S$b$1, S$c$1 will thus be:

$$\frac{8}{3}E$$

minus the source voltage E, giving $$\frac{5}{3}E$$

as shown in curve D of FIG. 3. The reverse voltage $$-\frac{5}{3}E$$

from anode to cathode of the top row of controlled rectifiers S$a$1, S$b$1 and S$c$1 reverse biases these devices turning them off so that there will be zero current flow through the anode cathode circuits thereof.

The capacitor C1 begins its discharge through the windings 1-2 and 3-4 through the controlled rectifier S1, with the capacitor C2 beginning to charge positively from its —3E value toward a +4E value at the time $t$2. The capacitor C1 goes from the +4E value to a —3E value at the time $t$2 in FIG. 3. The capacitors C1 and C2 will be charged to a somewhat greater value than the +4E and —3E values due to ringing because of the reactive elements in charging and discharging circuitry. However, these effects are small and have been neglected herein for, the purposes of simplicity of explanation and since the ringing does not otherwise affect the operation of the inverter as described.

Curve E of FIG. 3 shows the current flow I$_{1-2}$ through the winding 1-2 and thus also the winding 3-4 and device S1. In the circuit of FIG. 1 the magnitude of current carried by the commutating controlled rectifier S1 when fired to instigate commutation is equal to two-thirds the current carried just prior to $t$1 by the winding 1-2 since the additional 1 N turns of the winding 3-4 are placed in series with the winding 1-2. This provides a substantial reduction in the amount of current carried by the device S1 as compared to previous designs and permits the use of controlled rectifiers for S1 and S2 having low current rating as compared to previous designs. For example, in typical circuits used in the past, the commutating controlled rectifiers are usually connected to center taps on an inductor which may have an equivalent number of turns as the windings 1-2 and 1'-2'. Thus, when a commutation controlled rectifier is fired, only 1 N turns of winding will be in the discharge path, thereby requiring that current therethrough increases to double that carried just prior to t1 by the inductor. It is therefore required that the commutation switching devices in the original circuit having a much higher current rating than that of the circuit described. In the circuit of FIG. 1, it is necessary that the commutation controlled switching devices S1 and S2 have a higher voltage rating, however, this is offset by the smaller current rating. Moreover, in that higher voltages are used for charging the capacitor C1 and C2, it is permissible to use capacitors having lower capacitances which provides for savings in size and weight that is highly desirable in many applications.

During the time interval that the anodes of the top row of bridge devices Sa1, Sb1 and Sc1 are at a negative potential, load current is maintained through the load impedances Za, Zb and Zc through a circuit path beginning at the output terminal Tb, through the device Sb2, the winding 1'-2', the diodes Da2 and Dc2, the impedance elements Za and Zc and through the impedance element Zb to the terminal Tb. The voltage across the top row of controlled rectifiers shown in curve D of FIG. 3 increases from its $$-\frac{5}{3}E$$

value at the line t1 and reaches a positive +3E value at the time t2 when the capacitors C1 and C2 have charged to the proper levels for the next commutation interval. The current $I_{1-2}$ passing through the winding 1-2 shown in curve E of FIG. 3 increases to a maximum value and then decreases with a phase reversal of the voltage thereacross occurring as shown in curve C of FIG. 3. The current $I_{1-2}$ continues to decrease until time t2 when both capacitors C1 and C2 have reached desired values for the next commutation interval.

During the time interval t1–t2, no current flows through the winding 5-6 of the inductor L1 in that the diode D1 is reversed biased during this interval. The voltage from anode to cathode of diode D1 is shown in curve F of FIG. 3 and as indicated has a value $$\frac{7}{3}E$$

at the time t1 and decreases to zero at the time t1 when the capacitor C1 is charged to the negative voltage −3E as shown in curve A of FIG. 3. At the time t1, the voltage across the winding 1-2 is equal to −2E. Therefore, the voltage across the winding 5-6 is equal to −E thereby removing the reverse bias from the diode D1 and permitting it to conduct from anode to cathode to complete a current path through the winding 5-6 to the B+ line. The current through the winding 5-6 is shown by the dotted curve $I_{5-6}$ in curve E of FIG. 3. Conduction of the current $I_{5-6}$ through the coil 5-6 returns any stored energy in the inductor L1 to the B+ line and the DC source V, with the current $I_{1-2}$ in the coil 1-2 falling substantially immediately to zero as does the current in the winding 3-4 to maintain the amp-turns in the inductor L1. The current through the controlled rectifier S1 thus goes to zero turning off this device at the time t2. Return of stored energy to the DC source V through the winding 5-6 provides for a highly efficient inverter in that this energy would otherwise have to be dissipated, for example, by a resistive network connected across the winding 1-2. Moreover, conduction of the diode D1 clamps the voltage level of the capacitor C1 at the desired −3E level thereby accurately establishing this voltage at its desired commutating level. The voltage across the top row of controlled rectifier devices Sa1, Sb1, Sc1 goes to the source voltage E at the time t3 as can be seen in curve D of FIG. 3 when the current $I_{5-6}$ through the winding 5-6 has gone to zero as shown in curve E of FIG. 3. At the time t3 any stored energy in the inductor L1 has been returned to the DC source V and selected ones of the top row of bridge devices Sa1, Sb1, and Sc1 can be gated on again.

Referring again to FIG. 2 and curve Sa1 thereof, it can be seen that it is necessary that the pulse ga1 be terminated at the time T1 and then be reapplied to the gate Ga1 of the controlled rectifier Sa1 after a time delay. This is required in order to permit the extraction of stored energy from the inductor L1. This delays the application of voltage to the load impedances Za, Zb and Zc for a short interval of time while the energy is being recovered from the inductor L1 or L2. However, after the time delay pulse ga1 is reapplied to the gate electrode Ga1 of the controlled rectifier Sa1 to provide a conductive path therethrough to the load impedance Za. The other controlled rectifiers Sb1 and Sc1 do not have pulses applied thereto during time interval T1–T2. However, the controlled rectifier Sb2 of the bottom row continues to have the gate pulse gb2 applied thereto maintaining it in a conductive state and the controlled rectifier Sc2 has a pulse gc2 applied thereto to turn it on at the time T1. Circuits are completed through load impedance Za to provide two units of positive voltage therethrough, with one unit of negative voltage being supplied to the load impedances Zb and Zc. These voltages continue until the next commutation at the time T2.

At the time T2 the commutation of the bottom row of controlled rectifier devices Sa2, Sb2 and Sc2 is instigated. At this time a gating pulse g2 is applied to the bottom commutating control rectifier S2 which provides a discharge path therethrough for the capacitor C2 through the windings 1'-2' and 3'-4' of the inductor L2. Reverse bias is thus applied across the bottom row of controlled rectifier devices causing the current therethrough to be reduced to zero. During the time interval that the bottom row of devices is reverse biased, current is maintained through the load impedances Za, Zb and Zc in circuit paths being provided from the output terminal Ta through the load impedance Za, load impedances Zb and Zc and output terminals Tb and Tc, respectively, and diodes Db1 and Dc1, respectively, to the B+ line, and through the winding 1-2, the controlled rectifier Sa1 to the output terminal Ta.

The capacitor C2 charges from the +4E voltage to a −3E voltage, while the capacitor C1 charges to the +4E voltage level. At the time the capacitor C2 reaches the −3E voltage, the diode D2 which had previously been reverse biased is now forward biased to provide a conductive path therethrough and through the winding 5'-6' to return stored energy in the inductor at L2 to the B+ line and the DC source V. The current through the device S2 is thus reduced to zero and turns off, with the current through the winding 5'-6' reducing to zero as the stored energy is extracted from the inductor L2. The capacitor C1 is now charged to +4E voltage and the capacitor C2 is charged to a −3E voltage, with the clamping action of the diode D2 establishing the voltage on the capacitor C2. At this time, the pulse gc2 may be applied to the controlled rectifier Sc2 to render it conductive, and, with the controlled rectifiers Sa1 and Sb1 being conductive at this time, voltage will then be applied to the load impedances Za, Zb and Zc. One unit of positive voltage is supplied to the impedances Za and Zb and two units of negative voltage to the load impedance Zc. These voltage levels continue until the time T3 when commutation of the top row of controlled rectifier devices is to take place. The operation of the inverter thus continues in a similar manner as described.

Figure 4:
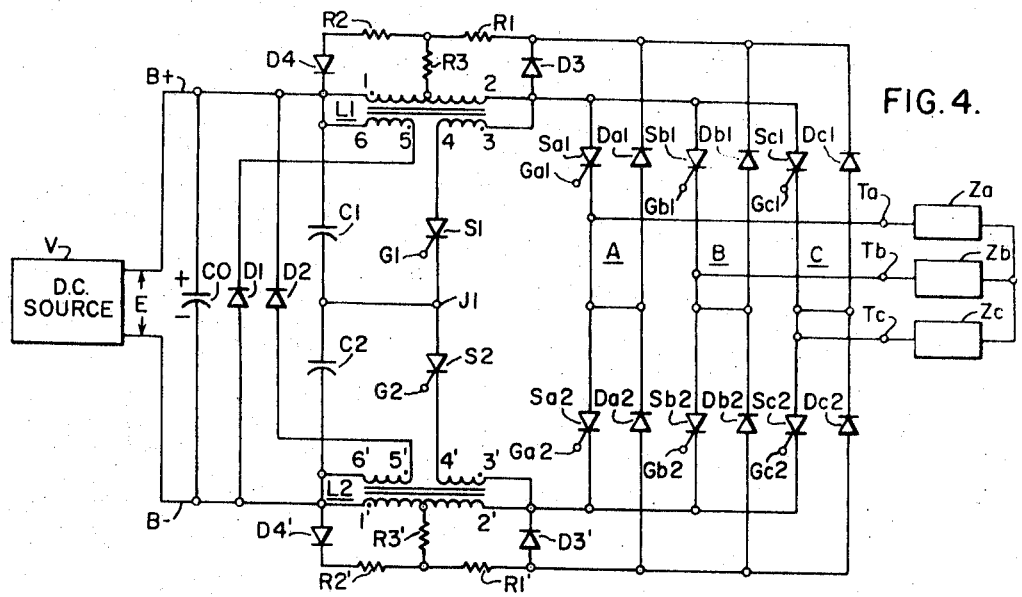
FIG. 4 is a schematic-block diagram of another embodiment of the present invention.

FIG. 4 shows another embodiment of the present invention wherein full conduction of the load currents may be maintained through the load impedances Za, Zb and Zc during the commutation period of the inverter. The circuitry as shown in FIG. 4 is identical to that of FIG. 1 except that energy dissipating circuits are connected across the coil 1'-2' of the inductor L1 and across the coil 1'-2' of the inductor L2 and center taps are provided on coils 1-2 and 1'-2'. The energy dissipating circuit for the transformer L1 includes the series connection of a diode D3, a resistor R1, a resistor R2 and a diode D4 connected between the 2 and 1 ends respectively of the winding 1-2. The anode of the diode D3 is connected to the 2 end of the winding 1-2 and the cathode thereof is connected to the cathode of the diodes D$a$1, D$b$1 and D$c$1. The cathode of the diode D4 is connected at the 1 end of the coil 1-2. A resistor R3 is connected between the junction of the resistors R1 and R2 and the center tap on the winding 1-2. The energy recovery circuit for the transformer L2 is identical to that as for the inductor L1 with the prime designations indicating the similar components.

The energy dissipation circuitry of FIG. 4 permits the immediate returning on of selected ones of either the top or bottom row of controlled rectifiers of the bridge circuit after commutation. This is accomplished by providing a current path for stored energy in the respective inductors L1 and L2 whenever the reverse bias is removed from the particular row being commutated. Thus it is not required in the circuit of FIG. 4 to wait until one of the capacitors C1 or C2 has reached the —3E voltage level and the respective diode D1 or D2 is conductive and recover the stored energy in the respective inductors L1 and L2 before the elected ones of the row of controlled rectifiers is turned on again as is the case in FIG. 1.

When the anodes of the top row of controlled rectifiers S$a$1, S$b$1, S$c$1, for example, are positive again after having been commutated, a circuit path is provided through the diode D3, the resistors R1 and R2 and the diode D4 to the B+ line to dissipate a portion of the stored energy in the inductor L1. Thus any of the controlled rectifiers of the top row may be turned on immediately after commutation such as shown in FIG. 5 at the time T1 with the pulse g$a$1 being continuously applied to the gate of the controlled rectifier S$a$1 while as can be seen in FIG. 2, it was necessary that the pulse g$a$1 be interrupted at the time T1 and then reapplied after a time delay permitting the energy recovery cycle to be completed in the circuit of FIG. 1.

The inverter operation otherwise continues as that of FIG. 1, with the capacitors C1 and C2 charging as indicated in curves A and B of FIG. 3 until one of capacitors reaches the —3E value and the respective diode D1 or D2 in series with the windings 5-6 or 5'-6' becomes forward biased and clamps that capacitor at this voltage value and thereby returning the remaining stored energy in respective inductors L1 and L2 to the DC source V.

Figure 5:
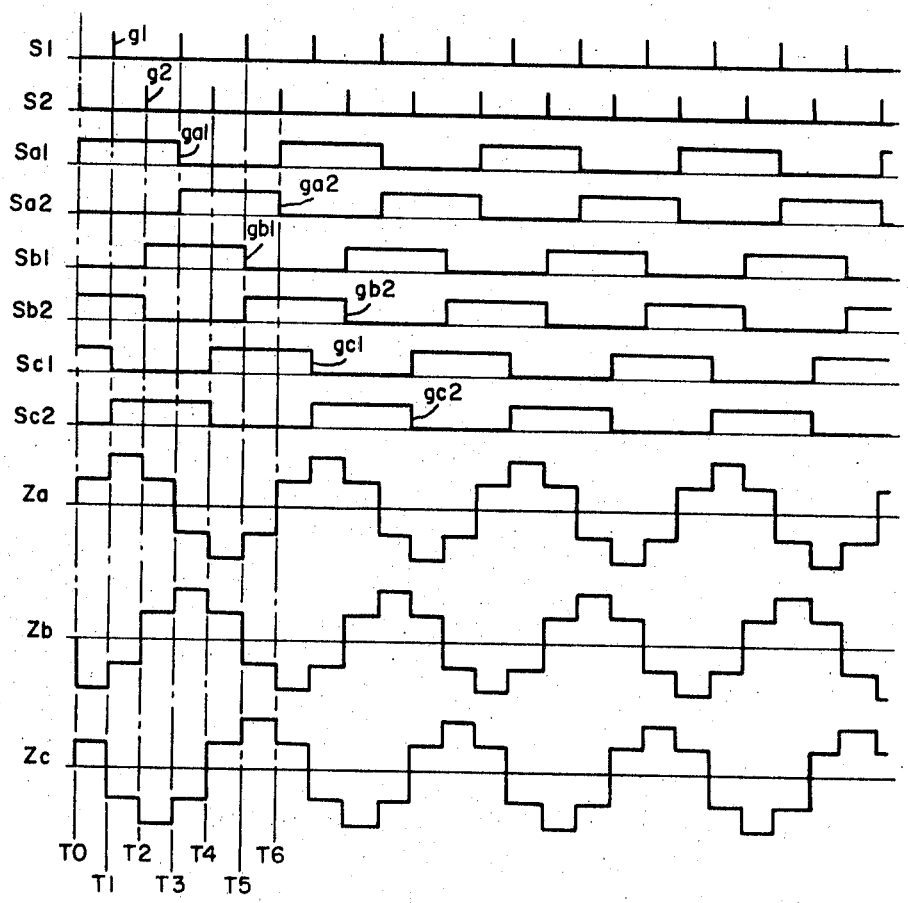
FIG. 5 shows a plurality of waveforms utilized in explaining the operation of FIG. 4.

As can be seen from the curves E$za$, E$zb$, and E$zc$ of FIGURE 5 continuous voltage is applied to the load impedances Z$a$, Z$b$ and Z$c$ rather than the interrupted voltage waveforms as shown in the curves E$za$, E$zb$ and E$zc$ of FIG. 2. The supply of continuous voltage through these impedances, however, is provided at the expense of dissipating some of the stored energy in the inductors L1 and L2 in the dissipating circuits thereby lowering the overall efficiency of the inverter. Nonetheless, in those instances where continuous current is desired rather than high efficiency of operation the circuit of FIG. 4 may be utilized. The other advantages as explained with reference to FIG. 1 also apply.

Although the present invention has been described with a certain degree of particularity, it should be understood that the present disclosure has been made only by way of example and that numerous changes in the details and the combination arrangement of parts, elements and components can be resorted to without departing from the spirit and scope of the present invention.

We claim as our invention:

1. In inverter apparatus operative with a direct current source for supplying alternating current to a load and including a plurality of controlled switching devices for controllably completing a circuit to said load, the combination of:

commutating inductance means including first, second and third winding means, said first winding means operatively connected between said source and said plurality of controlled switching devices;

capacitance means operatively connected to said source and said inductance means for acquiring a charge level;

a commutating controlled switching device operatively connected to said inductance means to effect commutation of said plurality of controlled switching devices by providing a discharge path for said capacitance means through said inductance means;

said second winding means coupled in current transformer relation to said first winding means and to said commutation controlled switching device, said third winding means coupled in voltage transformer relation to said first and second winding means; and a unidirectional device operatively connected to said third winding means and to said source and being nonconductive during commutation of said plurality of controlled switching devices and being rendered conductive when the charge level of said capacitance means reaches a predetermined level to return energy stored in said inductance means to said source.

2. The combination of claim 1 wherein:

said capacitance means operatively connected to said first and third winding means, said commutation control switching device operatively connected to said second winding means with said discharge path being provided through said first and second winding means.

3. The combination of claim 2 wherein:

said first winding means comprising a first coil connected between said source and said plurality of controlled switching devices, said second winding means comprising a second coil connected in series between said first coil and said commutation control switching device, said third winding comprising a third coil connected in series with said unidirectional device.

4. The combination of claim 3 wherein:

said unidirectional device comprises a diode being reverse biased during commutation of said plurality of control switching devices by the voltage induced in said third coil and being forward biased into conduction to return stored energy in said transformer means to said source when said capacitance means reaches said predetermined charge level.

5. A combination of claim 1 including:

an energy dissipation circuit operatively connected across said inductance means to dissipate a portion of the storage energy in said transformer prior to the conduction of said unidirectional device to permit the immediate turn-on of the previously commutated ones of said plurality of controlled switching devices.

6. In inverter apparatus operative with a source of direct current for supplying polyphase alternating current to a polyphase load and including a bridge circuit including controlled switching devices in the legs thereof for controllably completing a circuit to said load, the combination of:

first and second commutating inductance means each including first, second and third winding means;

said first winding means of said first and second transformer means, respectively, operatively connected between the positive and negative terminals of said source and said bridge circuit;

first and second capacitance means connected in series across said source to said first and second inductance means, respectively, and for acquiring charge levels;

first and second commutating controlled switching devices operatively connected in series between said second winding means of said first and second inductance means, respectively, to effect commutation of the controlled switching devices of said bridge circuit by providing a discharge path for said first and second capacitor means, respectively, through said first and second inductance means;

said second winding means coupled in current transformer relation to said first winding means in the respective of said inductance means;

said third winding means coupled in voltage transformer relation to said first and second winding means in the respective of said inductance means; and first and second unidirectional devices operatively connected to said third winding means in the respective of said inductance means and to said source, said first and second unidirectional devices being respectively operative when said first and second commutation control switching devices are operative to effect commutation;

said first and second of said unidirectional devices being nonconductive during commutation of said plurality of control switching devices and being rendered conductive when the charge level of said first and second capacitive means, respectively, reaches a predetermined level to return energy stored in said first and second inductance means respectively to said source.

7. The combination of claim 6 wherein:

said first and second capacitance means operatively connected to said first and third winding means of said first and second inductance means, respectively, said first and second commutation control switching devices operatively connected to said second winding means of said first and second inductance means, respectively, with respective discharge paths being provided through said first and second windings of said first and second inductance means, respectively.

8. The combination of claim 7 wherein:

said first winding means of each of said first and second inductance means comprising a first coil connected between the positive and negative electrodes of said source, respectively, and said plurality of controlled switching devices;

said second winding means of said first and second inductance means comprising a second coil connected in series between said first coil and said first and second commutation controlled switching devices, respectively, and said third winding means of said first and second inductance means comprising a third coil connected in series with said first and second unidirectional devices, respectively.

9. The combination of claim 8 wherein:

said first and second unidirectional devices comprising a first and a second diode, respectively, said diodes being reverse biased during commutation of said plurality of controlled switching devices by the voltage induced in respective of said third coils and being rendered conductive to return stored energy in said first and second inductance means, respectively, to said source when said first and second capacitance means, respectively, have reached said predetermined charge levels.

10. The combination of claim 6 including:

first and second energy dissipating circuits operatively connected across said first and second inductance means, respectively, to dissipate a portion of the stored energy in said first and second inductance means, respectively, prior to conduction of said first and second unidirectional devices, respectively, to permit the immediate turn on of previously commutation ones of said plurality of controlled switching devices.

References Cited

UNITED STATES PATENTS

| | | | |
|---|---|---|---|
| 3,263,153 | 7/1966 | Lawn | 321—45 |
| 3,340,453 | 9/1967 | Bradley et al. | 321—5 |
| 3,343,068 | 9/1967 | Studtmann et al. | 321—45 |
| 3,349,315 | 10/1967 | Studtmann | 321—45 |
| 3,388,310 | 6/1968 | Etter | 321—5 |
| 3,406,325 | 10/1968 | Rosa | 321—5 |

JOHN F. COUCH, Primary Examiner

W. H. BEHA, Jr., Assistant Examiner

U.S. Cl. X.R.

321—45